US008884532B2

(12) United States Patent
Jones et al.

(10) Patent No.: US 8,884,532 B2
(45) Date of Patent: Nov. 11, 2014

(54) PHOTO CONTROL FOR A LUMINAIRE

(75) Inventors: Richard S. Jones, West Columbia, SC (US); Dale Thomas, Cleveland, GA (US); Hal Adair, Canton, GA (US); N. Rodger Williamson, III, Leesville, SC (US)

(73) Assignee: Ripley Lighting Controls, LLC, West Columbia, SC (US)

( * ) Notice: Subject to any disclaimer, the term of this patent is extended or adjusted under 35 U.S.C. 154(b) by 419 days.

(21) Appl. No.: 13/480,754

(22) Filed: May 25, 2012

(65) Prior Publication Data

US 2013/0313979 A1  Nov. 28, 2013

(51) Int. Cl.
H05B 41/36 (2006.01)
H05B 39/04 (2006.01)

(52) U.S. Cl.
USPC .......................................... 315/159; 315/156

(58) Field of Classification Search
CPC ......... H05B 37/02; H05B 33/08; Y02B 20/46
USPC .......... 315/156–159, 150, 200 R, 209 R, 246, 315/291
See application file for complete search history.

(56) References Cited

U.S. PATENT DOCUMENTS

| 1,326,732 | A |  | 12/1919 | Holme |
|---|---|---|---|---|
| 1,688,588 | A |  | 10/1928 | Lomax et al. |
| 5,870,317 | A |  | 2/1999 | Barnett et al. |
| 5,990,635 | A | * | 11/1999 | Ference et al. ................ 315/362 |
| 6,059,427 | A |  | 5/2000 | Wedell et al. |
| 6,452,340 | B1 |  | 9/2002 | Morrissey, Jr. et al. |
| 6,841,944 | B2 |  | 1/2005 | Morrissey et al. |
| 7,348,690 | B2 |  | 3/2008 | Muldoon |
| 7,566,987 | B2 | * | 7/2009 | Black et al. ..................... 307/41 |
| 7,569,802 | B1 |  | 8/2009 | Mullins |
| 7,782,280 | B2 |  | 8/2010 | Wood |
| 8,038,481 | B1 |  | 10/2011 | Creighton et al. |
| 2006/0125426 | A1 |  | 6/2006 | Veskovic et al. |
| 2007/0185675 | A1 |  | 8/2007 | Papamichael et al. |
| 2007/0293208 | A1 |  | 12/2007 | Loh et al. |
| 2008/0043316 | A2 |  | 2/2008 | Moskowitz |
| 2009/0153288 | A1 |  | 6/2009 | Hope et al. |

FOREIGN PATENT DOCUMENTS

WO  WO 2011/123614 A1  10/2011

* cited by examiner

Primary Examiner — Minh D A
(74) Attorney, Agent, or Firm — Michael A. Mann; Nexsen Pruet, LLC

(57) ABSTRACT

An improved lighting control for a luminaire operates an LED luminaire so that its relay opens and closes at or very near the zero current cross-over point so as to reduce the in-rush current to the luminaire, and, if the relay contacts do become stuck, the photo control senses the sticking and electronically vibrates the relay to free its contacts.

9 Claims, 5 Drawing Sheets

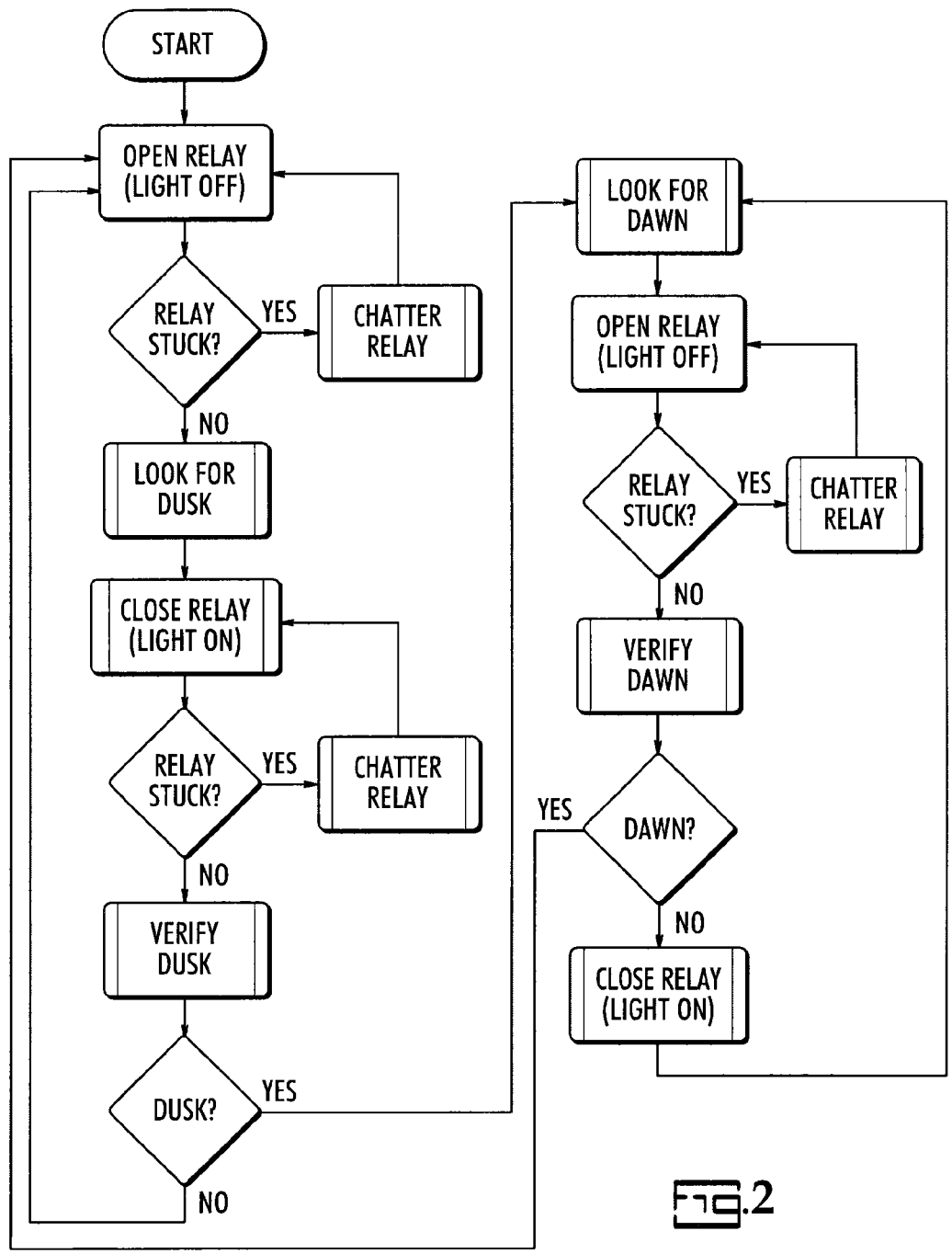

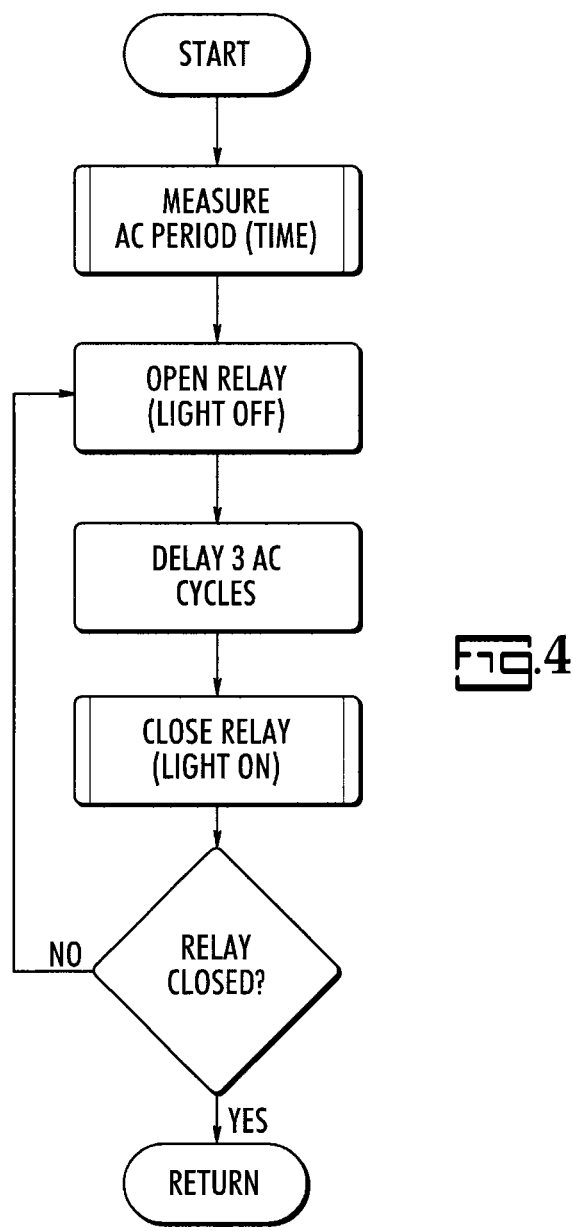

PHOTO CONTROL FOR A LUMINAIRE

PRIORITY CLAIMS

None.

BACKGROUND OF THE INVENTION

The present invention relates to photo controls, which are devices that are used, for example, to turn roadway lighting, signage and area lighting on and off.

Photo controls typically use electromechanical relays to switch the electric current to luminaires on and off. The power to a luminaire can be up to 1,000 watts, and the associated current can stress a relay's electrical contacts. For example, high currents cause the relay's contacts to pit and degrade, and eventually to stick together or, more precisely, to weld together. Thus, stress on the relay within a photo control is often an important limitation on the potential useful life span of a photo control.

In addition, due to the increased interest in saving energy and reducing light pollution, photo controls may cycle on and off more often, for example, turning on a luminaire at sunset, but then off again just after midnight when activity and traffic is greatly reduced, then back on just before dawn as activity starts to pick up, and then back off yet again at sunrise. This cycle effectively doubles the number of times the luminaire's relay must open and close.

Newer outdoor luminaires use LED's as the light source. LED's typically require an electronic driver. These electronic drivers may cause a high in-rush current, which further stresses the contacts of the photo control's relay.

Furthermore, because LED luminaires operate at lower temperatures, they have a longer life span than lighting system that operate at elevated temperatures, making it all the more imperative that the photo control for an LED-based luminaire have as long a lifespan as possible, ideally lasting as long as the LEDs in the luminaire itself.

One solution is to make the relay for a photo control larger, thus enabling the photo control to handle stress and thereby expand the relay's life expectancy. However, larger relays are more expensive. In addition, the size of the relay that can be used is constrained by the size of the photo control, which is in turn limited by industry standards.

Thus, there remains a need for a way to extend the lifespan of a relay in a photo-control for a luminaire.

SUMMARY OF THE INVENTION

The present invention is an improved lighting control for a luminaire. In particular, the present photo control operates the relay in such a way that it lasts longer by minimizing the pitting and welding of its contacts. Longer life is achieved by arranging to close the relay contacts at or very near the zero voltage cross-over point in order to avoid higher in-rush currents, and, if the relay contacts do become stuck, the photo control vibrates them electronically to open them.

The present method includes sensing a level of ambient light proximate to a luminaire connected to a source of alternating electrical current through a relay. Closing the relay connects the current with said luminaire; opening the relay disconnects the luminaire. The relay is closed to power the luminaire by de-energizing it and opened to turn the luminaire off by energizing it. In order to avoid the current inrush on closing the relay, the actual closing is timed to coincide with the zero crossing voltage level. By first predicting the zero crossing voltage based on the period of the alternating current and then determining a delay time between when a signal is sent to the relay to de-energize and when the relay actually closes, and then advancing that signal to the relay by that delay time, the microprocessor can send the so-advanced signal to de-energize said relay at the right time so that the relay actually closes at the zero crossing voltage level. Then, the relay is energized to disconnect power to the luminaire, say, when the level of sensed ambient light rises above a pre-selected light level, and energizing the relay in order to connect the electrical power to the luminaire when the level of sensed ambient light falls below the pre-selected level. If the relay does not open, then alternatingly energizing and de-energizing the relay in a series of short pulses to urge it to open.

The present invention is a photo control for a luminaire connected to an AC line voltage, including a light sensor that produces light level signals indicative of levels of ambient light, a zero-voltage crossing sensor that produces a zero-crossing signal based on the period of the alternating current, a relay in electrical connection with the AC line voltage and the luminaire with its closed position connecting the AC line voltage with said luminaire and its open position disconnecting the AC line voltage from the luminaire, and a microprocessor in electrical connection with the light sensor, the zero-voltage crossing sensor, and the relay. The microprocessor determines the period for the zero voltage level from the zero-crossing signal, sends a signal to the relay to move the relay to its open position and closed position depending on the level of that light with respect to a pre-selected light level, and alternatingly energizes and de-energizes the relay in a series of short pulses in the event the relay does not open or close in response to an open relay signal. In addition the photo control includes a low voltage detector and a high voltage detector connected between the relay and the luminaire. Each generates a pulse when said AC voltage is negative or positive, respectively, when the relay closes. The delay between when the signal is given to de-energize the relay and the actual closing of the relay contacts is predicted by measuring the time between the leading edge of the positive (or negative) pulse and the next zero-crossing of the AC voltage waveform. That predicted delay can be used to adjust the close relay signal so that the relay closes when the zero voltage crossing occurs.

BRIEF DESCRIPTION OF THE DRAWING

In the figures,

FIG. 2 is a diagram of the main loop routine showing the sequence of operational steps for the present photo control of FIG. 1, according to an embodiment of the present invention;

FIG. 4 is a diagram of the chatter relay subroutine of the main loop routine of FIG. 2 for the present photo control of FIG. 1, according to an embodiment of the present invention.

DETAILED DESCRIPTION OF PREFERRED EMBODIMENTS

The present invention is a photo control for a luminaire; it is also a luminaire system that includes both the luminaire and its photo control, and it is a method for controlling a luminaire. In particular, the present photo-control determines when the supplied alternating current is about to cross the zero voltage point in its cycle and then signals the relay to close so that, when the relay actually closes, it closes at or very near the zero crossing point so the inrush current is minimized in order to reduce the stress on the relay contacts.

Furthermore, if the relay contacts do become stuck, the photo control alternatingly energizes and de-energizes the relay, causing them to vibrate or "chatter" in an attempt to free them.

Figure 1A:
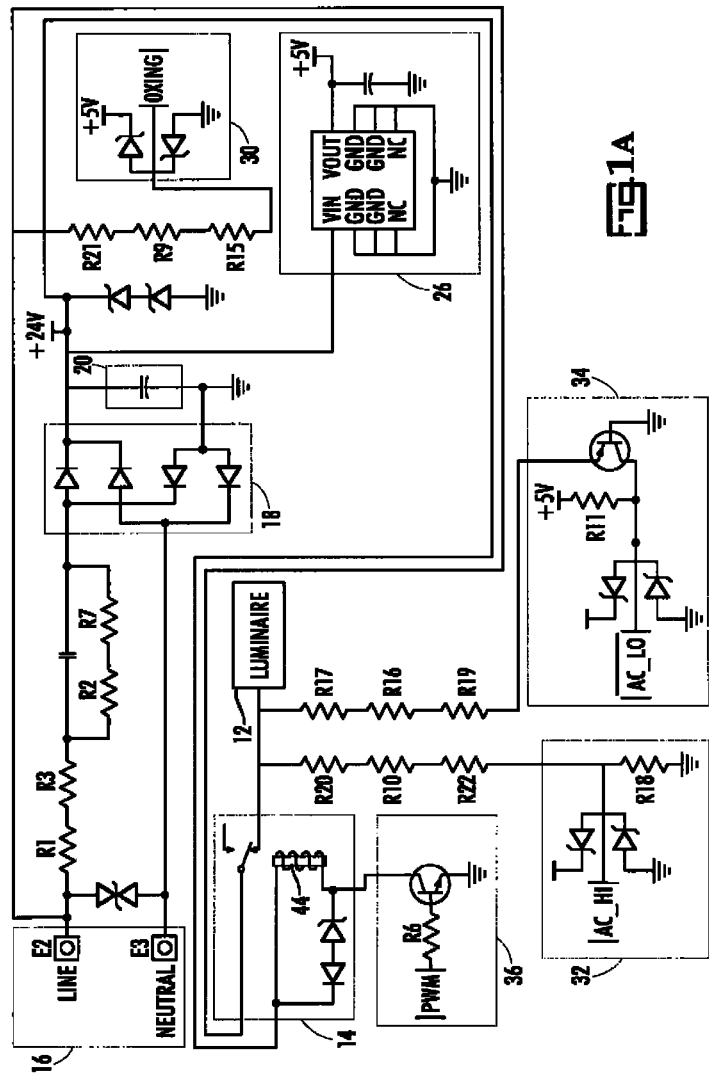
FIGS. 1A and 1B show a two part schematic drawing of an electrical circuit of an embodiment of a photo control connected to a luminaire, according to the present invention.
Figure 1B:
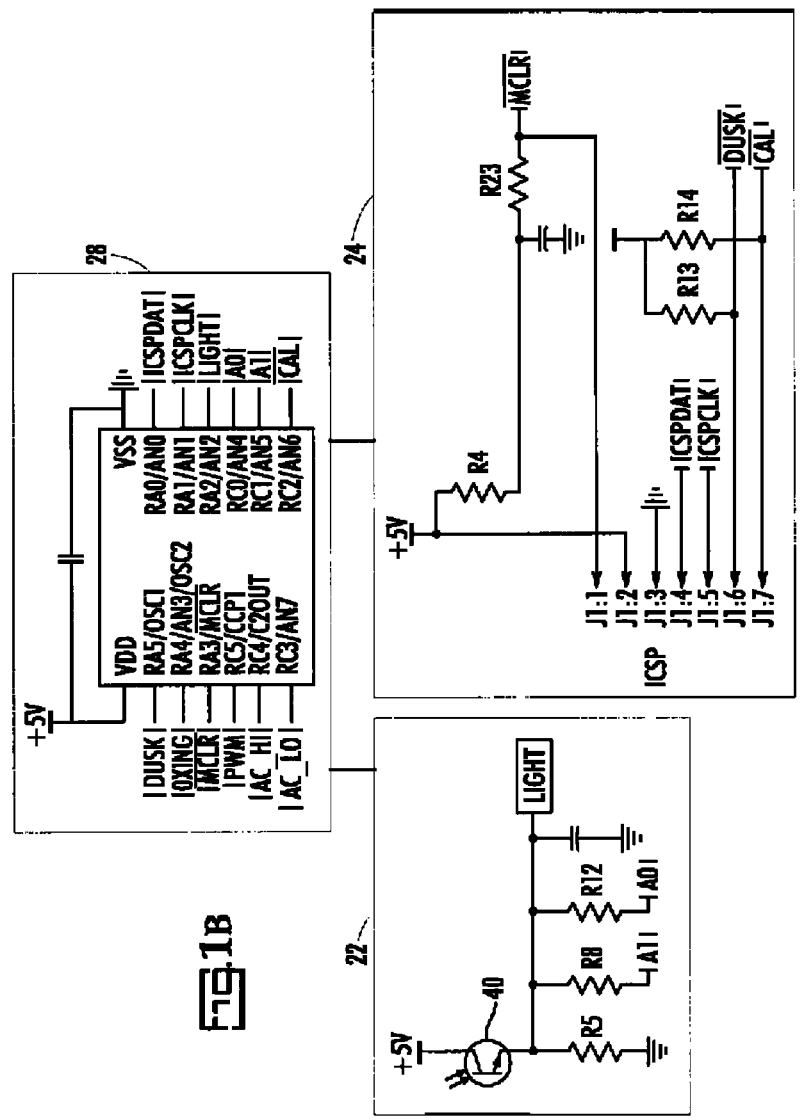

Reference is now made to FIGS. 1A and 1B, wherein a schematic of a representative electronic circuit is shown in two parts, one part in FIG. 1A and the second part of the same schematic shown in FIG. 1B. The schematic of FIGS. 1A and 1B shows an electrical circuit for a photo control and luminaire circuit connected to an alternating current (AC) power source 16 of a voltage suitable for operating luminaire 12. In addition to luminaire 12, this circuit includes a relay 14, a rectifier 18 and voltage filter 20, a light sensing circuit 22, a programmable controller 24, a DC power supply 26, a microprocessor 28, a zero cross-over detector 30, a high voltage detector 32, a low voltage detector 34, and a relay close circuit 36.

Other circuit components shown are used in ways familiar to those skilled in the art of electrical circuit design, such as components for dropping the voltage to an appropriate level and for surge protection. These will not be discussed herein but are shown in the present schematic for completeness. Also, those skilled in the art of electronics will understand that alternative electric components may be assembled to perform the same overall functions as those shown in FIGS. 1A and 1B. However, such choices are within the skill of those familiar with electrical circuit components once the present invention is fully understood and are within the spirit and scope of the present invention. The embodiment shown is a representative embodiment and not intended to be the only embodiment that will achieve the objectives of the present invention.

Luminaire 12 may be an LED-based luminaire or other lamp, such as metal halide, high pressure sodium, or simply an incandescent lamp.

Connection to an alternating current (AC) line voltage is made on the left end of the circuit in FIG. 1A at power source 16. The full AC line voltage provided by power source 16 is delivered to luminaire 12 when relay 14 is closed by moving its contacts from the open position to the closed position to de-energize coil 44. Relay 14 is thus biased to the closed position and must be energized to open its contacts. A circuit could be designed to have the same features as the present invention but with a relay biased to the open position and that must be energized to close its contacts.

The line voltage from power source 16 is rectified to produce full wave direct current (DC) by rectifier 18 and then conditioned by filter 20. The direct current (DC) output of filter 20 is input to a DC power supply 26 that outputs 5 volts to microprocessor 28 (see +5 v output from power supply 26 and +5V input to microprocessor 28 in FIGS. 1A and 1B). The output of filter 20 is also input to a solenoid 44 that operates relay 14 that, when energized, opens relay 14.

Microprocessor 28 (FIG. 1B) controls the operation of luminaire 12 using input from light sensor 22, programmable controller 24 and three voltage signals generated from the line voltage to luminaire 12. Light sensor 22 includes a phototransistor 40 that provides an output light signal (LIGHT) to a corresponding terminal of microprocessor 28. The light signal is proportional to the ambient light in the environment of light sensor 22. Programmable controller 24 provides means through inputs J1:1 to J1:7 to program microprocessor 28 and calibrate light levels that define dawn and dusk in terms of ambient light levels. See outputs of programmable controller 24: MCLR, CSPDAT, CSPCLK, DUSK and CAL that input to their respective terminals of microprocessor 28.

One of the three other voltage signals to microprocessor 28 is provided by zero-crossing detector 30 (OXING), electrically connected to the input line to relay 14 and which determines when the AC line voltage wave form crosses the zero voltage level. A second of the three voltage signals (AC_HI) is received by microprocessor 28 from high voltage detector 32, connected to the output line of relay 14 and which senses when the line voltage is positive. Finally, the third voltage signal (AC_LO) is provided to microprocessor 28 by low voltage detector 34, also connected to the output line from relay 14 and which senses when the line voltage is negative. Each of these three signals is produced using a clip circuit that outputs a square wave indicative of the cross over point, the positive voltage and the negative voltage, respectively, on the AC line. Importantly, zero crossing detector 30 is up-stream of relay 14 and high and low voltage detectors 32, 34, are downstream of detector 30.

Using the first of these three signals, microprocessor 28 can determine the start of each half cycle and can use that information to measure the period of the AC wave form and to predict when the next zero voltage crossing will occur. The present photo control will want relay 14 to close at that zero voltage level thereby avoiding or at least reducing the inrush current to minimize stress on relay 14.

Because relay 14 takes a small but finite amount of time to close after microprocessor 28 signals it to close through relay closing circuit 36, voltage signals from high and low voltage detectors 32, 34, which are both positioned downstream of relay 14 are used to fine tune the timing of the close relay signal from microprocessor 28 to close relay circuit 36. They are used to determine the relay delay time and to use that delay time to advance, or adjust forward in time, the timing of the signal from microprocessor 28 to close relay circuit 36 in order to have the actual closing of relay 14 occur as close as possible to the zero crossing point.

The adjustment for the delay between the signal to relay 14 to close and the actual closing of relay 14 is made as follows. The period of the AC wave form comes from successive zero-crossing signals (OXING) to microprocessor 28 as sequential OXING pulses are received. When relay 14 is closed, the high or low voltage detectors 32, 34, both generate square waves. The first of these square waves starts when the relay actually closes and ends at the next zero crossing point. The width of the first pulse will be reduced from a full pulse by the delay between when microprocessor 28 signals relay 14 to close and when relay 14 actually does close. The delay is thus determined experimentally by closing relay 14 at the zero crossing time predicted by timing the leading edge of the negative (or positive) pulse until the next zero crossing. That interval then gives the amount of time needed to advance the signal to relay 14 that tells relay 14 to close. Pulse width of course is proportional to time measured by microprocessor 28 clock time so the difference in width corresponds to the delay time. The time difference can be subtracted from the wave form period held by microprocessor 28 to advance its signal via relay close circuit 36 to relay 14 by just enough so that, when relay 14 actually closes, it closes as the AC wave form is crossing the zero voltage level.

In addition to reducing the stress on relay 14 by avoiding inrush current on closing, microprocessor also attempts to unstick a relay 14 in the event it becomes stuck in the open or closed position. If microprocessor 28 senses relay 14 is not opening despite the relay open signal from relay open circuit 36, it then waits briefly and reapplies the relay open signal, repeating the relay open signal with a frequency on the order of 10 Hz, a little more or less, in an attempt to "toggle" or vibrate or "chatter" the contacts of relay 14 free of each other so they open fully. Microprocessor 28 repeatedly checks relay 14 after each attempt to determine if it has opened. Once relay 14 opens, microprocessor 28 halts the series of relay open pulses. This relay chatter subroutine will be described more fully below but the main operational loop will be described presently.

Microprocessor 28 is programmed as shown in FIG. 2. Power is supplied by microprocessor 28 through its PWM terminal to relay open circuit 36 and then to relay 14 to open its contacts because relay 14 is biased to the closed position. If relay 14 is stuck in the closed position (because its contacts are welded, for example), microprocessor 28 will attempt to unstick it by sending a series of signals to relay open circuit 36 to open relay 14 using the chatter subroutine. If relay 14 responds, microprocessor 28 proceeds through the main loop.

Microprocessor 28 looks for a signal (LIGHT) from light sensing circuit 22 indicating the ambient light level in order to determine if that light level corresponds to dusk as programmed by program controller input (DUSK) to microprocessor 28. Dusk is input to programmable controller 24 in terms of light level. At dusk, microprocessor 28 closes relay 14 by signaling open relay circuit 36 to energize coil 44. If relay 14 fails to close, but instead is stuck in the relay open position, microprocessor 28 switches from its main loop routine to chatter subroutine (FIG. 4), described below. If relay 14 closes, microprocessor 28 continues to verify that dusk (the period of low light) continues but begins to look for dawn, defined by a signal from light sensing circuit 22 indicating ambient light is increasing.

At dawn, microprocessor 28 opens relay 14 by energizing it. Once again, if relay 14 fails to open, chatter subroutine (FIG. 4) is invoked. If relay 14 opens properly, the power to luminaire 12 is terminated. Microprocessor 28 continues to verify dawn until it is no longer sufficiently light but is in fact dusk again, at which time, relay 14 is deenergized to close it to provide power to luminaire 12. Different cycles can be programmed into programmable controller 24.

Figure 3:
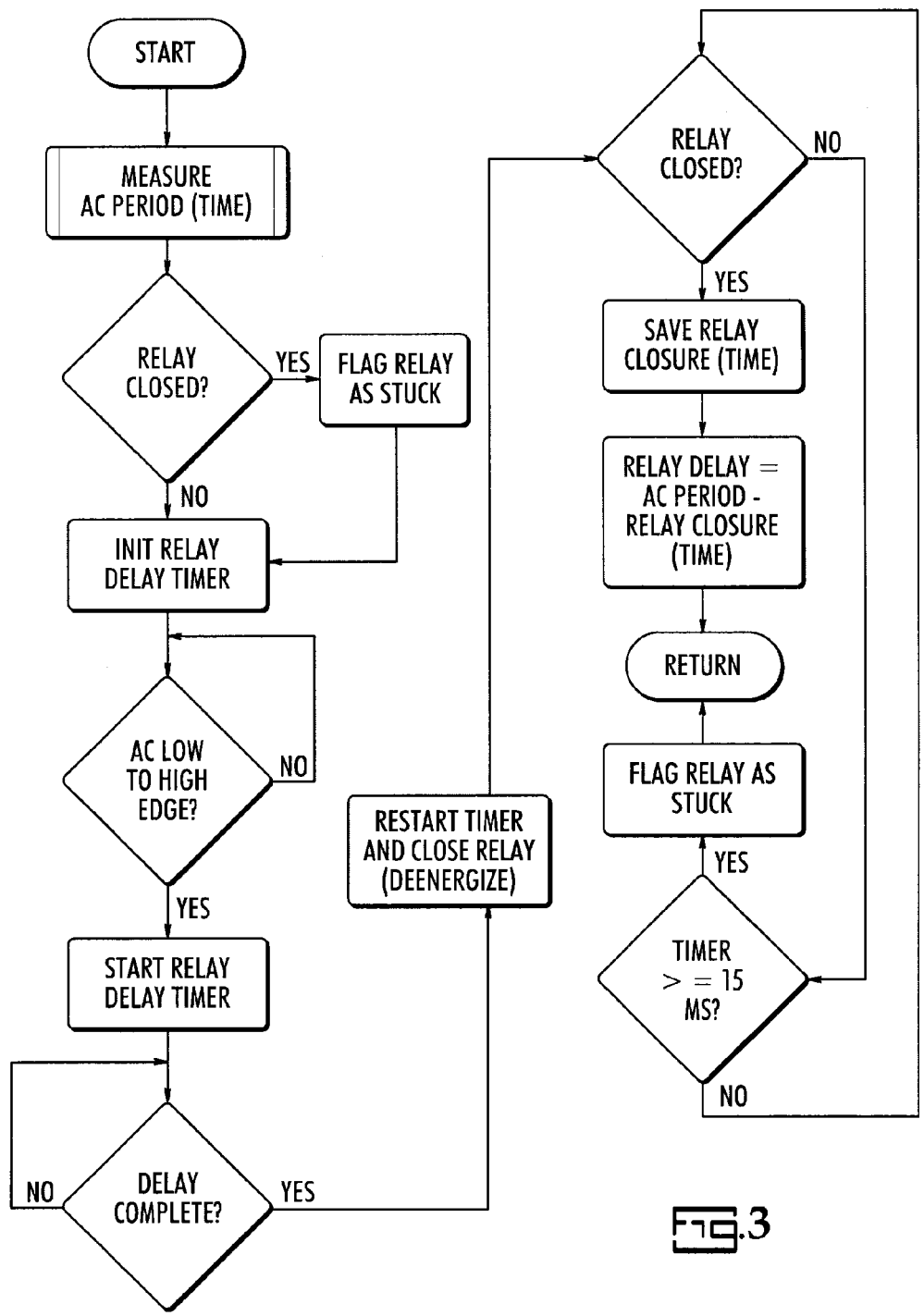
FIG. 3 is a diagram of the "close relay" subroutine of the main loop routine of FIG. 2 for the present photo control of FIG. 1, according to an embodiment of the present invention.

FIG. 3 shows in detail the close relay function described above, which is a second subroutine followed by microprocessor 28 and which is designed to close relay 14 with minimum current inrush. Relay 14 is closed by de-energizing it to turn on luminaire 12. Microprocessor 28 continually measures and averages the period of the AC waveform, which varies slightly from cycle to cycle, by detecting the time intervals between zero crossing points using zero crossing detector 30. If relay 14 is closed at the start of this subroutine, it is flagged as being stuck. Otherwise, with relay 14 open, microprocessor 28 proceeds to initiate a relay delay timer by looking for the width of the pulse detected by the AC low power detector 34. The edge of that pulse starts the relay delay timer. Once the preselected relay delay time is complete, relay 14 is closed.

In the chatter routine, illustrated in FIG. 4, microprocessor 28 energizes relay 14 by a signal to relay open circuit 36, then, after waiting three cycles (about 1/20$^{th}$ of a second), de-energizes relay 14 in an attempt to close it. If relay 14 closes, the chatter subroutine ends and microprocessor 28 returns to the main loop sequence. If relay 14 fails to close but rather remains open despite being de-energized, microprocessor 28 again energizes relay 14, waits three cycles, and then de-energizes relay 14. If relay 14 has now closed, it is no longer stuck, and microprocessor 28 returns to the main loop sequence, otherwise, it continues indefinitely.

Those skilled in the art of luminaire control will appreciate from the foregoing that many modifications and substitutions can be made in the foregoing embodiment without departing from the spirit and scope of the present invention, which is defined by the appended claims.

What is claimed is:

1. A method for controlling a luminaire, said method comprising the steps of:
   (a) sensing a level of ambient light proximate to a luminaire connected to a source of electrical current, said electrical current alternating between a positive voltage and a negative voltage, said source of alternating electrical current having a period, said alternating electrical current being in electrical connection to a relay which is in electrical connection with said luminaire so that closing said relay connects said alternating electrical current with said luminaire and opening said relay disconnects said alternating electrical current from said luminaire;
   (b) de-energizing said relay so that said relay closes as said alternating electrical current crosses a zero voltage level between a negative and a positive voltage, using said period of said alternating electrical current to predict said zero voltage level, in order to dis-connect electrical power to said luminaire when said level of sensed ambient light rises above a pre-selected light level;
   (c) energizing said relay so that said relay opens as said alternating electrical current crosses said zero voltage level, in order to connect said electrical power to said luminaire when said level of sensed ambient light falls below said pre-selected level; and
   (d) alternatingly energizing and de-energizing said relay in a series of short pulses when said relay does not open to urge said relay to open.

2. The method as recited in claim 1, wherein said de-energizing step further comprises the steps of:
   (a) determining a delay time between when a signal is sent to said relay to de-energize and when said relay opens;
   (b) advancing said signal to said relay by said delay time; and
   (c) sending said advanced signal to de-energize said relay.

3. A method for controlling a luminaire connected to a relay having an open position and a closed position, said luminaire being connected to a source of alternating electrical current when said relay is in an closed position and disconnected from said source when said relay is in said open position, said alternating electrical current alternating about a zero current level, said method comprising the steps of:
   (a) predicting the crossing of a zero current level from a period of said alternating electrical current;
   (b) causing said relay to move to said closed position as said alternating electrical current crosses said zero current level; and
   (c) alternatingly energizing and de-energizing said relay in a series of short pulses when said relay becomes stuck in said closed position in order to cause said relay to move to said open position.

4. The method as recited in claim 3, wherein said closing step further comprises the steps of:
   (a) determining the delay time between when a signal is sent to said relay to cause said relay to move to said closed position and when said relay has moved to said closed position;
   (b) advancing said signal in time with respect to the occurrence of said zero current level by said delay time; and (c) sending said advanced signal to said relay to move to said closed position close to the occurrence of said zero current level.

5. A photo control circuit for a luminaire connected to an AC source, said AC source alternating in current above and below a zero current level, said photo control circuit comprising:
   (a) a light sensor proximate to a luminaire, said light sensor producing light level signals indicative of levels of ambient light proximate to said luminaire;
   (b) a zero-current crossing sensor that produces a zero-crossing signal when said AC source crosses said zero current level;
   (c) a relay in electrical connection between said AC source and said luminaire, said relay having an open relay position and a closed relay position, said closed relay position connecting said AC source to said luminaire and said open position disconnecting said AC source from said luminaire; and
   (g) a microprocessor in electrical connection with said light sensor, said zero-current crossing sensor, and said relay, said microprocessor sending a signal to said relay to move said relay to said relay open position or said relay close position when said zero crossing signal is received and when said light level signal from said light sensor indicates ambient light is above or below, respectively, a pre-selected light level, said relay being responsive to said signal from said microprocessor.

6. The photo control circuit as recited in claim 5, further wherein said microprocessor alternatingly energizes and de-energizes said relay in a series of short pulses in the event said relay does not open in response to said microprocessor in order to open said relay.

7. The photo control circuit as recited in claim 5, wherein said zero current crossing sensor is connected between said AC source and said relay, and wherein said photo control further comprising:
   (a) a low voltage detector connected between said relay and said luminaire;
   (b) a high voltage detector connected between said relay and said luminaire,
   wherein said low voltage detector generates a low voltage pulse when said AC voltage is negative and said high voltage detector generates a high voltage pulse when said AC voltage is positive, said low voltage pulse having a leading edge and said high voltage pulse having a leading edge,
   wherein said microprocessor determines a time delay between a first leading edge of said leading edge of said low voltage pulse and said leading edge of said high voltage pulse and said signal from said zero current crossing sensor, said time delay being used by said microprocessor to advance said signal from said microprocessor to said relay to open and close said relay.

8. A luminaire system, said luminaire system being connectable to a source of alternating current, said alternating current varying between a positive and a negative current, said luminaire system comprising:
   (a) a luminaire;
   (b) a relay having an input and an output line, a relay open position and a relay closed position, said luminaire being connected to said output line of said relay so that, when said input line of said relay is connected to a source of alternating current and said relay is in said closed position, electrical current flows to said luminaire;
   (c) a zero crossing sensor in operational connection with input side of said relay, said zero crossing sensor sending a zero crossing signal whenever said voltage on said input line to said relay is zero; and
   (d) a microprocessor having a clock and being in operational connection with said relay and said zero crossing sensor, said microprocessor receiving said zero crossing pulses, said processor being adapted to predict when said zero crossing pulses will occur, said microprocessor being adapted to de-energize said relay near a zero crossing pulse in order to move said relay to said relay closed position and to energize said relay to move said relay to said open position, wherein said microprocessor is adapted to move said relay to said relay open position from said relay closed position if said relay is stuck in said relay closed position by alternatingly energizing and de-energizing said relay in a series of pulses.

9. The luminaire system as recited in claim 8, further comprising a relay close circuit between said input line to said relay and said microprocessor, said relay close circuit receiving said signal from said microprocessor to move said relay to said closed position and de-energizing said relay in response to said relay close signal, and further comprising a high voltage sensor and a low voltage sensor, said high voltage sensor being attached to said output line of said relay and sending a high voltage pulse to said microprocessor, said high voltage pulse being generated when said voltage from said output side of said relay is positive, said low voltage sensor being attached to said output line of said relay and sending a low voltage pulse to said microprocessor, said pulse of said low voltage sensor being generated when said voltage from said output side of said relay is negative, said low voltage pulse having a leading edge and said high voltage pulse having a leading edge, wherein said microprocessor is adapted to determine the difference between a first leading edge of said leading edges of said high voltage and said low voltage pulses and said zero crossing signal and to advance said zero crossing signal from said microprocessor to said relay by said difference.

* * * * *